United States Patent [19]
Locatelli

[11] Patent Number: 6,131,351
[45] Date of Patent: Oct. 17, 2000

[54] SYNTHETIC TEXTILE SUPPORT FOR BITUMINOUS SHEATHS, PARTICULARLY FOR COATING ROOFS

[75] Inventor: Achille Locatelli, Torno, Italy

[73] Assignee: Freudenberg Politex S.R.L., Milan, Italy

[21] Appl. No.: 09/077,008

[22] PCT Filed: Nov. 11, 1996

[86] PCT No.: PCT/EP96/05006

§ 371 Date: May 18, 1998

§ 102(e) Date: May 18, 1998

[87] PCT Pub. No.: WO97/18364

PCT Pub. Date: May 22, 1997

[30] Foreign Application Priority Data

Nov. 16, 1995 [IT] Italy .................................. MI95A2353

[51] Int. Cl.[7] ........................................................ E04D 5/10
[52] U.S. Cl. ............................ 52/309.1; 52/409; 156/178; 428/489

[58] Field of Search ...................................... 52/309.1, 409, 52/DIG. 16; 428/219, 141, 340, 489; 156/176, 278, 313, 324

[56] References Cited

U.S. PATENT DOCUMENTS

4,230,762  10/1980  Iwasaki et al. .
4,762,744   8/1988  Woiceshyn et al. ..................... 428/219
5,118,550   6/1992  Baravian et al. .
5,439,726   8/1995  Woiceshyn .

FOREIGN PATENT DOCUMENTS

0 185 169  6/1986  European Pat. Off. .

*Primary Examiner*—Christopher T. Kent
*Attorney, Agent, or Firm*—Millen, White, Zelano & Branigan, P.C.

[57] ABSTRACT

A synthetic textile support for bituminous sheaths, particularly for the coating of roofs. The textile support consists of two layers of non-woven lap of polyester fibers, between which there is interposed a plurality of continuous polyester threads arranged parallel to one another in the longitudinal direction of the textile support.

10 Claims, 1 Drawing Sheet

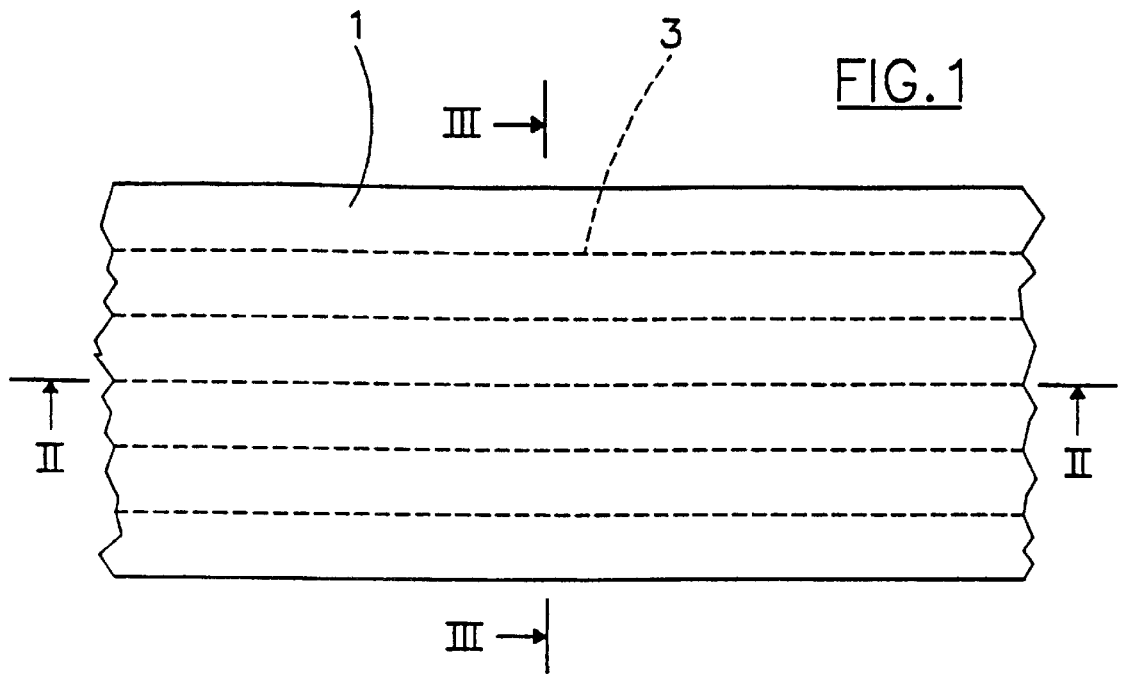
FIG.1
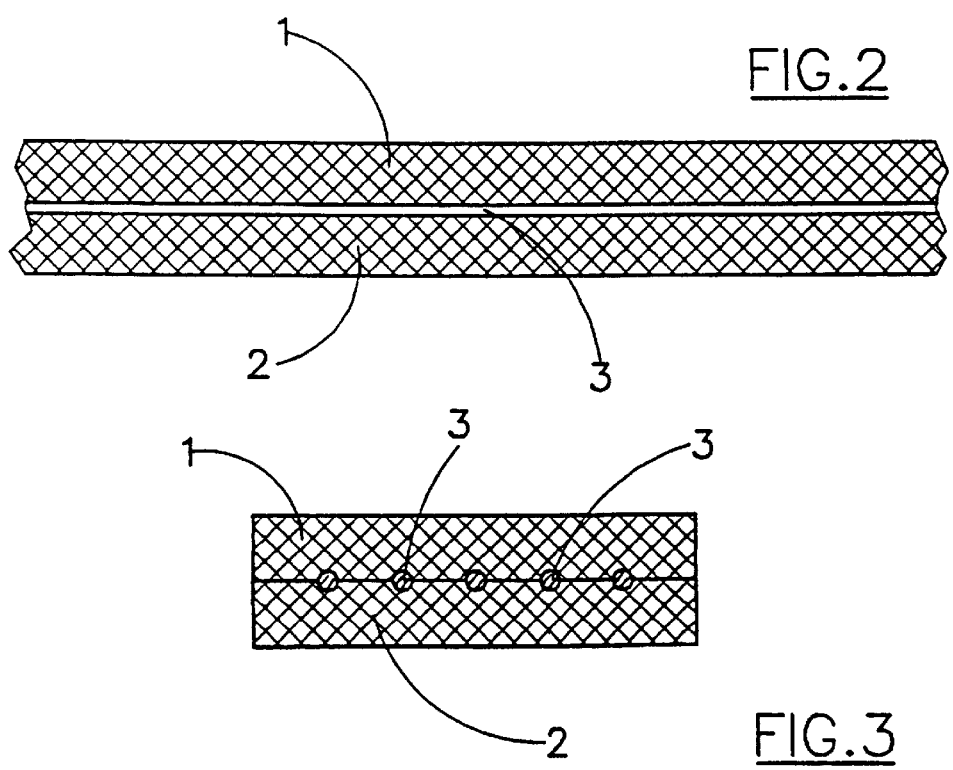
FIG.2
FIG.3

SYNTHETIC TEXTILE SUPPORT FOR BITUMINOUS SHEATHS, PARTICULARLY FOR COATING ROOFS

DESCRIPTION

The present invention relates to a synthetic textile support for bituminous sheaths, particularly for coating roofs.

The usage is well known in the art of manufacturing bituminous sheaths, such as those habitually used for coating roofs, of a synthetic textile support consisting of a non-woven lap of polyester staple or continuous thread fibre with an essentially transversal orientation.

For many years now, with the object of avoiding transversal shrinkage of the textile support when it is subjected to impregnation in bitumen, obtained by means of the passage under tension through a bitumen bath at high temperature, the same Applicant has inserted between two layers of traditional lap a thin layer of polyester fibre with filaments about 70 mm long arranged parallel to one another in the longitudinal direction of the textile support.

This solution has allowed the solution of the problem of transversal shrinkage during the step of impregnation in bitumen, but it has proved not very effective against another important problem, that arises after the bituminous sheath has been laid and that is represented by the response of the sheath to the thermal expansion during the summer of the roof that receives it. Due to the effect of such expansions, in fact, the bitumen softens up and the textile support tends to shorten due to the effect of the strain to which it has been subjected during processing.

From the Italian patent No. 1,237,149 and the corresponding U.S. Pat. No. 5,118,550 a synthetic textile support for bituminous sheaths is known, wherein a plurality of parallel continuous glass filaments is interposed and made to extend longitudinally between two layers of polyester fibre non-woven with the object of ensuring a suitable longitudinal reinforcement for the synthetic textile support.

The glass filaments, characterized by a high Young's modulus, exhibit on the other hand the drawback of representing a substantially rigid support that has a very good resistance to tractions up to a certain limit, but then breaks suddenly leaving the textile support without any longitudinal reinforcement. Moreover, even before it breaks, they react to the thermal expansions of the roof in a clearly different manner with respect to the polyester non-woven surrounding them, determining the creation of a series of ripples between one filament and the next. Lastly it is obvious that the usage of glass filaments implies during processing the presence of glass particles that cause harmful irritations to the operators, much as it creates obvious problems in the recovery of scraps and the disposal of waste.

In view of this state of the art, the object of the present invention has been that of providing a synthetic support for bituminous sheaths, that avoids transversal shrinkages of the product during impregnation and that stand up well and in an elastic manner to the thermal expansions of the roof after it has been laid.

According to the invention such object has been achieved with a synthetic textile support consisting of two layers of non-woven lap of polyester fibres, between which there is interposed a plurality of continuous reinforcing filaments arranged parallel to one another in the longitudinal direction of the textile support, characterized in that said continuous reinforcing filaments consist of polyester threads with a Young's modulus of less than 20 Gpa.

It has been possible to observe such a polyester reinforcement allows the textile support according to the invention to solve the problem of the products transversal shrinkage during impregnation in bitumen and at the same time to go along elastically with the thermal expansions of the roof after the bituminous sheath has been laid, extending and contracting in the same manner as the surrounding polyester lap and ensuring a resistance to extension that is less critical than that of the glass threads.

On the other hand, with respect to the product with the glass reinforcement threads of the known art, the textile support according to the invention also has the advantage that it avoids discomfort for the operators and ecological problems of all kinds, while at the same time allowing a greater possibility of recovery and reuse of waste.

One possible embodiment of the textile support according to the invention is illustrated as a non-limiting example in the enclosed drawings, wherein:

FIG. 1 shows the textile support in a plan view from above;

FIG. 2 shows the textile support in an enlarged longitudinal cross-section taken along the line II—II of FIG. 1;

FIG. 3 shows the textile support in an enlarged transversal cross-section taken along the line III—III of FIG. 1.

There is shown in the drawings a textile support according to the invention, that is formed by two layers 1 and 2 of non-woven polyester lap, staple or continuous thread, fastened together by means of threading, heat-shrinking or other suitable type of fastening.

Between the two layers of non-woven lap there is a plurality of continuous threads 3 of medium-strength polyester (Young's modulus less than 20 Gpa, preferably ranging from 10 Gpa to 14 Gpa), arranged parallel to one another in the longitudinal direction of the textile support.

Naturally the use of longitudinal reinforcement threads does not prevent, if when and desired, the simultaneous usage of similar threads of transversal reinforcement up to determining the creation of a thicker or thinner network of longitudinal and transversal polyester reinforcement threads.

What is claimed is:

1. A synthetic textile support for bituminous sheaths, particularly for coating roofs, consisting of two layers of non-woven lap of polyester fibers, between which there is a plurality of continuous reinforcing filaments consisting of polyester threads with a Young's modulus of less than 20 Gpa arranged parallel to one another in the longitudinal direction of the textile support.

2. A synthetic textile support according to claim 1, wherein said polyester threads exhibit a Young's modulus ranging from 10 Gpa to 14 Gpa.

3. A synthetic textile support according to claim 1, further consisting of a plurality of continuous reinforcing filaments arranged parallel to one another in the transversal direction to the textile support.

4. A synthetic textile support according to claim 1, wherein said non-woven lap is of staple fibers.

5. A synthetic textile support according to claim 1, wherein said non-woven lap is of continuous-thread fibers.

6. A synthetic textile support for bituminous sheaths, particularly for coating roofs, comprising:

two layers of non-woven polyester fibers; and a plurality of continuous reinforcing filaments comprising polyester threads with a Young's modulus of less than 20 Gpa arranged parallel to one another in the longitudinal direction of the textile support between the two layers of polyester fibers.

7. A synthetic textile support according to claim 6, wherein said polyester threads exhibit a Young's modulus ranging from 10 Gpa to 14 Gpa.

8. A synthetic textile support according to claim 6, further comprising a plurality of continuous reinforcing filaments arranged parallel to one another in the transversal direction to the textile support.

9. A synthetic textile support according to claim 6, wherein at least one layer of polyester fiber s comprises staple fibers.

10. A synthetic textile support according to claim 6, wherein at least one layer of polyester fibers comprises continuous-thread fibers.

* * * * *